US009765689B1

(12) United States Patent
Amplatz

(10) Patent No.: US 9,765,689 B1
(45) Date of Patent: Sep. 19, 2017

(54) INTERNAL COMBUSTION ENGINE WITH IMPROVED TORQUE TRANSMISSION

(71) Applicant: Kurt Amplatz, St. Paul, MN (US)

(72) Inventor: Kurt Amplatz, St. Paul, MN (US)

(*) Notice: Subject to any disclaimer, the term of this patent is extended or adjusted under 35 U.S.C. 154(b) by 0 days.

(21) Appl. No.: 15/419,554

(22) Filed: Jan. 30, 2017

Related U.S. Application Data

(63) Continuation-in-part of application No. 15/361,135, filed on Nov. 25, 2016, now abandoned.

(51) Int. Cl.
| | |
|---|---|
| *F02B 75/32* | (2006.01) |
| *F01B 9/04* | (2006.01) |
| *F16H 37/12* | (2006.01) |
| *F16H 31/00* | (2006.01) |
| *F16H 19/04* | (2006.01) |
| *F16H 21/18* | (2006.01) |

(52) U.S. Cl.
CPC .............. *F02B 75/32* (2013.01); *F01B 9/047* (2013.01); *F16H 19/04* (2013.01); *F16H 21/18* (2013.01); *F16H 31/001* (2013.01); *F16H 37/124* (2013.01)

(58) Field of Classification Search
CPC .......... F02B 75/32; F01B 9/047; F16H 19/04; F16H 21/18; F16H 31/001; F16H 37/124
See application file for complete search history.

(56) References Cited

U.S. PATENT DOCUMENTS

| 2,155,497 A | 4/1939 | Latil | |
|---|---|---|---|
| 3,459,056 A * | 8/1969 | Lea | ......................... F16H 35/00 74/29 |

* cited by examiner

*Primary Examiner* — Jacob Amick
(74) *Attorney, Agent, or Firm* — Hamre, Schumann, Mueller & Larson, P.C.

(57) ABSTRACT

An internal combustion engine includes a standard connecting rod as well as a gear rack. The connecting rod can be a standard connecting rod that reciprocates with the piston and that drives a rotatable crank mechanism to convert the reciprocating motion of the piston into rotation of the crankshaft. The gear rack is also connected to and reciprocates with the piston. The gear rack is engaged with a gear that is mounted on the crankshaft. A one-way drive mechanism is provided between the gear and the crankshaft that transmits torque (i.e. rotary force) to the crankshaft only during the power stroke of the piston.

19 Claims, 10 Drawing Sheets

INTERNAL COMBUSTION ENGINE WITH IMPROVED TORQUE TRANSMISSION

FIELD

This disclosure relates to internal combustion engines, in particular to an internal combustion engine with increased efficiency.

BACKGROUND

An internal combustion engine operates at relatively low efficiency. One reason for this is due to the circular movement of the crankshaft arm. Consequently, torque transmission from the piston is incomplete. Another indicator of this low efficiency is the relatively high temperature and pressure of exhaust gases at the output indicating a significant amount of energy from the combustion process is being lost.

U.S. Pat. No. 2,155,497 describes an example of an internal combustion engine with dual connecting rods and a rack that drives a gear.

SUMMARY

An improved internal combustion engine is described that has increased efficiency and high torque. The engine includes a standard connecting rod as well as a gear rack. The connecting rod can be a standard connecting rod that reciprocates with the piston and that drives a rotatable crank mechanism to convert the reciprocating motion of the piston into rotation of the crankshaft. The gear rack is also connected to and reciprocates with the piston. The gear rack is engaged with a gear that is mounted on the crankshaft. In one embodiment, the diameter of the gear is equal to two times the length of the crank arm of the crank mechanism which in turn equals the stroke of the piston. A one-way drive mechanism is provided between the gear and the crankshaft that transmits torque (i.e. rotary force) from the gear rack to the crankshaft only during the power stroke of the piston. The gear rack and the gear provide square torque transmission from the piston to the crankshaft.

Due to the one-way drive mechanism, the gear is rotated by the gear rack, and drives the crankshaft, in a forward direction during the power stroke of the piston, and on a return stroke of the piston the one-way drive mechanism allows the gear to rotate relative to the crankshaft when the gear is rotated by the gear rack in a reverse direction opposite the forward direction.

In one embodiment, an internal combustion engine includes a cylinder with a piston slidably disposed in the cylinder and that reciprocates relative to the cylinder, where the cylinder has a centerline and defines a combustion chamber. A connecting rod has a first end and a second end, and the first end is connected to the piston so that the connecting rod reciprocates with the piston. A first crank arm is connected to and is rotatably driven by the second end of the connecting rod by a pin, and a crankshaft is connected to and rotatably driven by the crank arm. In addition, a gear rack is provided that has an end that is connected to the piston so that the gear rack reciprocates with the piston. The gear rack is formed with teeth, and a gear that is mounted on the crankshaft has teeth that are engaged with the teeth on the gear rack. The gear is rotatable in forward and reverse directions by the gear rack, and a one-way drive mechanism is provided between the gear and the crankshaft. The one-way drive mechanism causes the crankshaft to rotate when the gear is rotated in the forward direction by the gear rack and allows the gear to rotate relative to the crankshaft when the gear is rotated in the reverse direction.

DRAWINGS

DETAILED DESCRIPTION

With reference to FIGS. 1-4, an embodiment of an internal combustion engine 10 includes a cylinder 12 with a piston 14 slidably disposed in the cylinder 12 and that reciprocates relative to the cylinder 12 in a known manner. The piston 14 is sealed with the sidewall of the bore of the cylinder 12 via conventional sealing rings. Conventional components such as a cylinder head closing the end of the cylinder 12, intake and exhaust valves on the cylinder head for permitting intake of air and fuel and exhausting combustion gases, a spark plug for initiating combustion, etc. are not illustrated for sake of convenience as these elements are not essential for an understanding of the claimed invention described herein.

Figure 6:
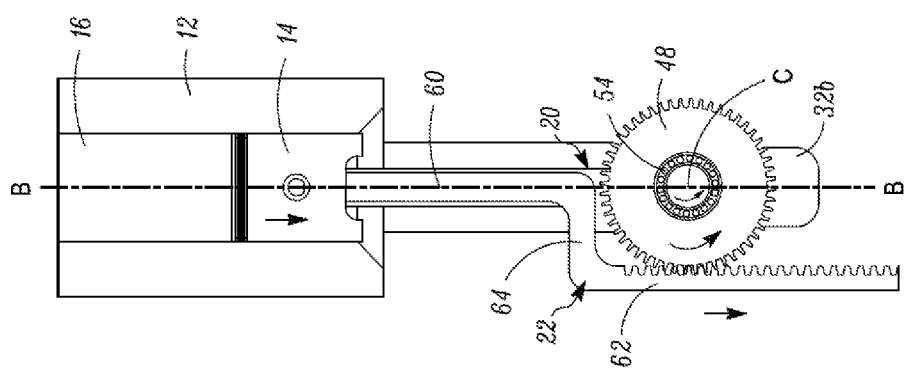
FIG. 6 is a side view of the internal combustion engine with the piston at or near the bottom dead center position in a combustion cycle.
Figure 7:
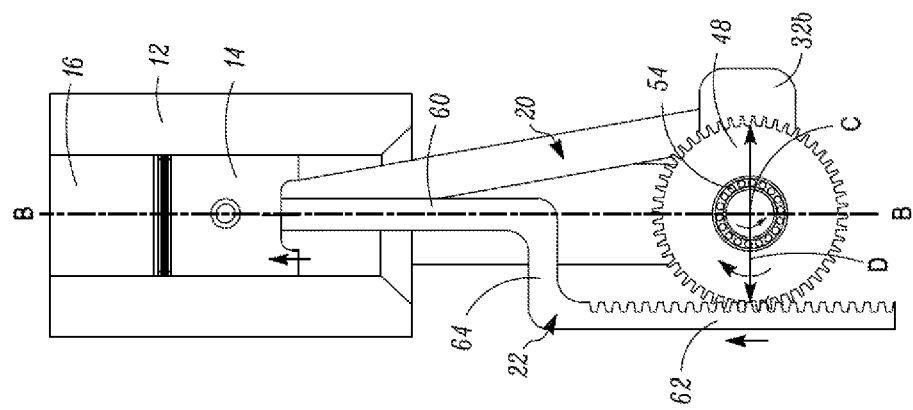
FIG. 7 is another side view of the internal combustion engine with the piston at an intermediate position returning back toward a top of the cylinder in the combustion cycle.

As is conventional, the area of the cylinder 12 above the piston 14 defines a compression/combustion/expansion chamber 16 (best seen in FIG. 6-7). An air and fuel mixture is introduced into the chamber 16 via one or more intake valves. The air/fuel mixture is compressed by the piston 14 on an upward stroke of the piston 14, then the compressed air/fuel mixture is ignited by a spark plug. The cylinder 12 and piston 14 described so far are conventional in construction and operation.

A connecting rod 20 and a gear rack 22 are connected to and reciprocate with the piston 14. The connecting rod 20 can be a standard connecting rod that reciprocates with the piston 14 and that drives a rotatable crank mechanism 24 to convert the reciprocating motion of the piston 14 into rotary motion of a crankshaft 36 about a rotation axis A-A.

Figure 1:
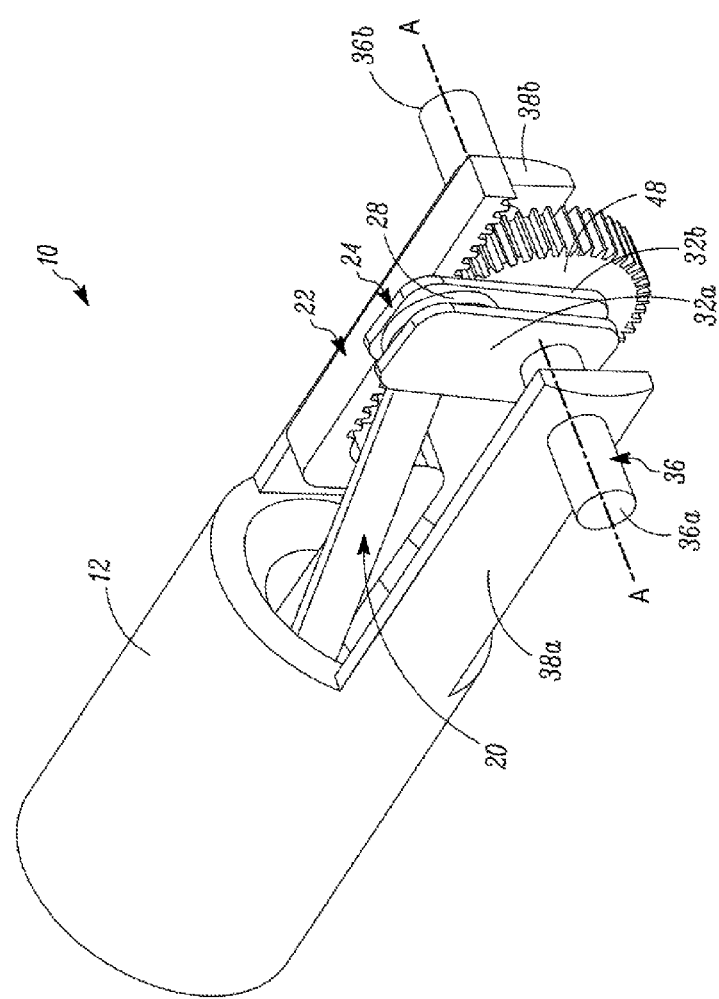
FIG. 1 is a perspective view of a portion of the internal combustion engine described herein.
Figure 2:
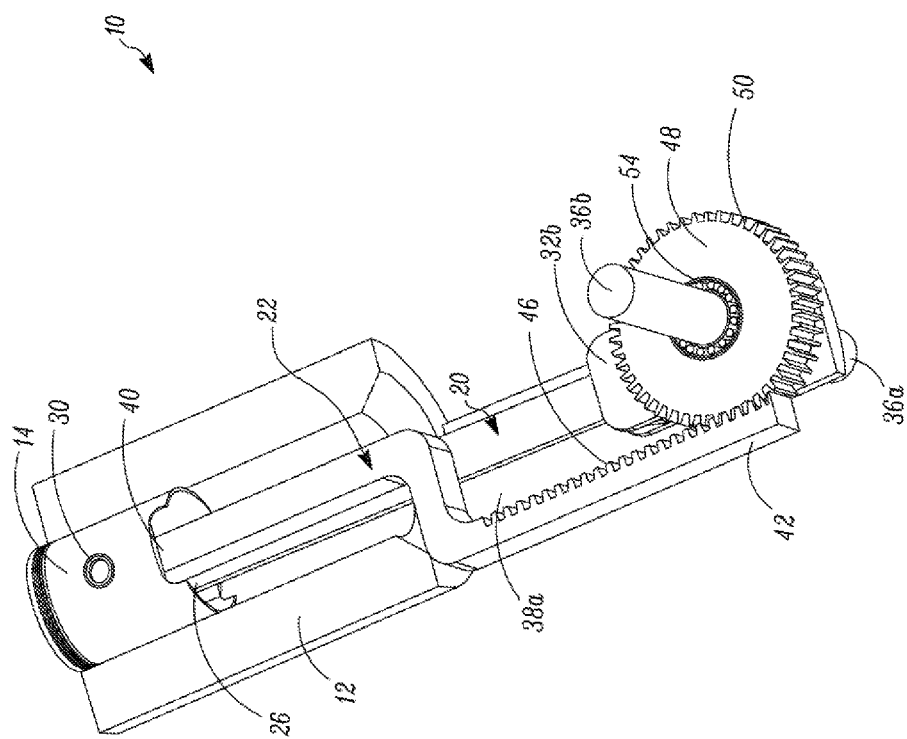
FIG. 2 is another perspective view of the internal combustion engine with half of the cylinder removed and the piston at or near a top dead center position.
Figure 3:
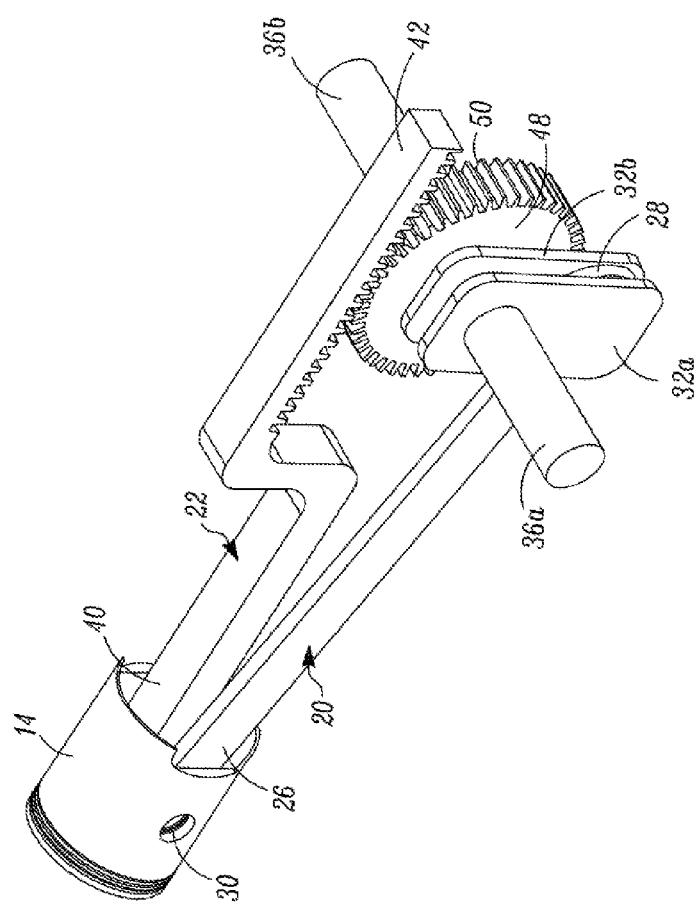
FIG. 3 is a perspective view of portions of the internal combustion engine with the cylinder removed.
Figure 4:
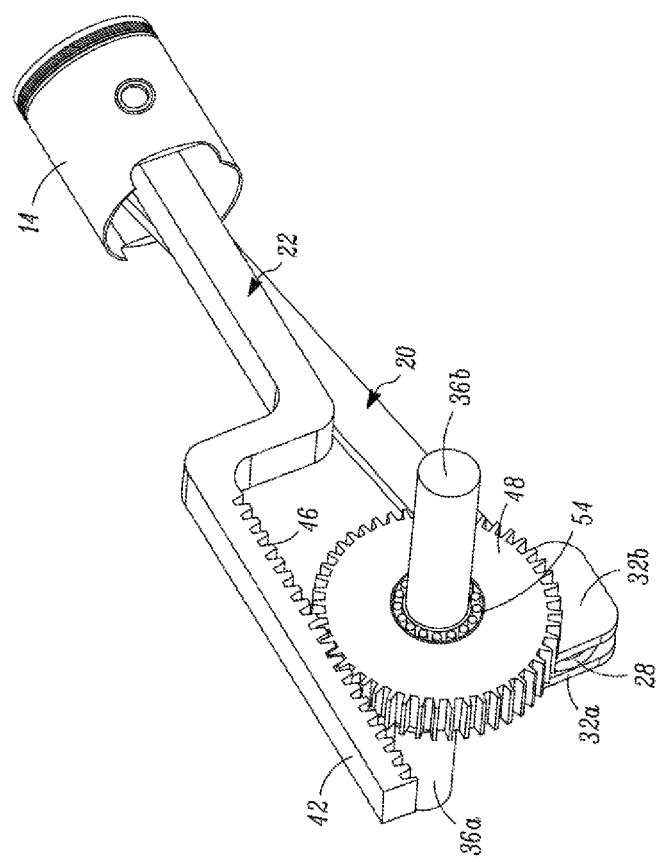
FIG. 4 is another perspective view similar to FIG. 3.

The rotatable crank mechanism 24 can have any construction that is suitable for converting the reciprocating motion of the piston 14 into rotary motion of the crankshaft 36 about the rotation axis A-A. Referring to FIGS. 1-5, in one non-limiting example of the rotatable crank mechanism 24, the connecting rod 20 has a first end 26 and a second end 28. The first end 26 is connected to the piston 14 by a pin 30 so that the connecting rod 20 is driven by, and can pivot relative to, the piston 14. The second end 28 of the connecting rod 20 is connected to a pair of crank arms 32a, 32b by one or more pins 34 (see FIG. 5). The crankshaft 36 is connected to and rotatably driven by the crank arms 32a, 32b for rotation about the rotation axis A-A. As seen in FIG. 1, the crankshaft 36 is rotatably supported by a pair of flanges 38a, 38b that extend downwardly from the bottom end of the cylinder 12.

In the illustrated example, the crankshaft 36 includes a first crankshaft portion 36a and a second crankshaft portion 36b. The first and second crankshaft portions 36a, 36b are collinear with one another, with the first crankshaft portion 36a connected to the crank arm 32a and the second crankshaft portion 36b connected to the crank arm 32b.

The gear rack 22 also reciprocates with the piston 14 and moves substantially in a straight line. Referring to FIGS. 1-5, the gear rack 22 has a first end 40 and a second end 42. The first end 40 is connected to the piston 14 by the pin 30 side-by-side with the first end 26 of the connecting rod 20, so that the gear rack 22 is driven by, and can pivot relative to, the piston 14. The second end 42 is provided with teeth 46 that engage with a gear 48 having corresponding teeth 50. The gear 48 is mounted on the crankshaft 36 to transmit torque to the crankshaft 36 during a power stroke of the piston 14. In the illustrated example, the gear 48 is mounted on the second crankshaft portion 36b.

A one-way drive mechanism 54 is provided between the gear 48 and the second crankshaft portion 36b. The one-way drive mechanism 54 transmits torque from the gear rack 22 and the gear 48 to the crankshaft 36 during the power stroke of the piston 14, and does not transmit torque from the gear rack 22 and the gear 48 to the crankshaft 36 during a return stroke of the piston 14. In particular, the one-way drive mechanism 54 causes the second crankshaft portion 36b to rotate when the gear 48 is rotated in a forward direction by the gear rack 22 during the power stroke or downstroke of the piston 14, and allows the gear 48 to rotate relative to the second crankshaft portion 36b when the gear 48 is rotated by the gear rack 22 in a reverse direction opposite the forward direction during the return stroke or upstroke of the piston 14. Therefore, the gear rack 22 and the gear 48 provide square torque transmission from the piston 14 to the crankshaft 36. As seen in FIG. 1, the second crankshaft portion 36b is rotatably supported by the flange 38b that extends downwardly from the bottom end of the cylinder 12 diametrically opposite the flange 38a that support the first crankshaft portion 36a. In addition, as best seen in FIG. 5, the crank arm 32b is also connected to the second crankshaft portion 36b so that the second crankshaft portion 36b is also driven by the connecting rod 20.

The one-way drive mechanism 54 between the gear 48 and the crankshaft 36 can be any mechanism that permits the gear 48 to drive the crankshaft 36 during the powerstroke of the piston 14 and that allows the gear 48 to rotate relative to the crankshaft 36 when the gear 48 is driven by the gear rack 22 during the return or upstroke of the piston 14. The one-way drive mechanism 54 may also be referred to as a one-way clutch, an overrunning clutch or a ratchet mechanism. The construction and operation of one-way drive mechanisms are well known in the art. One non-limiting example of a one-way drive mechanism that could be used is a sprag clutch.

Figure 5:
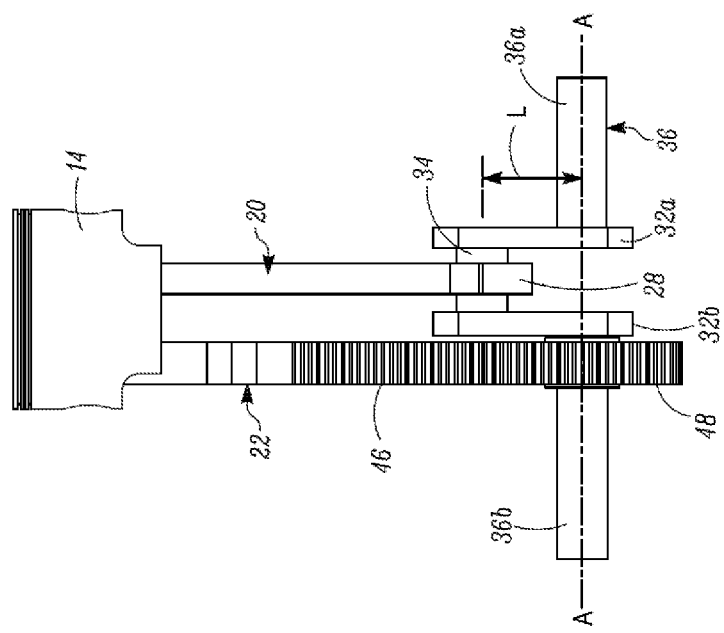
FIG. 5 is a side view of the internal combustion engine with portions removed for clarity.

Referring to FIGS. 5 and 7, the gear 48 has a diameter D and each of the crank arms 32a, 32b has a length L measured from the rotation axis A-A to a center of the pin 34. To provide synchronization between the connecting rod 20 and the gear rack 22, the diameter D of the gear 48 is equal to two times the length (D=2L) of the crank arms 32a, 32b which in turn is equal to a stroke of the piston 14.

Referring to FIGS. 1 and 5, in the illustrated embodiment the first and second crankshaft portions 36a, 36b are collinear with one another, and a rotation axis of the gear 48 is collinear with the rotation axis A-A of the crankshaft 36.

Referring to FIGS. 6 and 7, the gear 48 includes a center C, and a centerline B-B of the cylinder 12 extends through the center C of the gear 48. In other words, the gear 48 is disposed directly below the cylinder 12, providing a compact mechanical construction to the engine 10.

In addition, the teeth 46 are disposed on the gear rack 22 adjacent to the second end 42 thereof opposite the first end 40 that is connected to the piston 14. In the illustrated embodiment, the teeth 46 are integrally formed with the gear rack 22 to form a one-piece construction with the gear rack 22. However, in another embodiment, the teeth 46 could initially be separate from, but mechanically connected to, the gear rack 22.

The gear rack 22 can have any construction that is suitable for allowing the gear rack 22 to reciprocate with the piston 14 and for allowing the teeth 46 of the gear rack 22 to drive the gear 48 as the gear rack 22 reciprocates with the piston 14 to transfer rotational torque to the crankshaft 36. In the example illustrated in FIGS. 6 and 7, the gear rack 22 includes a first portion 60 that is parallel to and disposed on the centerline B-B of the cylinder 12, and the gear rack 22 further includes a second portion 62 that is parallel to and laterally spaced from the first portion 60 and parallel to and spaced from the centerline B-B. A connecting portion 64, which in some embodiments can be substantially horizontal or perpendicular to the axis A-A, connects the first portion 60 and the second portion 62.

Referring now to FIGS. 6 and 7, along with FIGS. 1-5, an operation of the engine 10 will now be described. FIG. 6 illustrates the piston 14 near completion or at completion of a power stroke or downstroke with the piston 14 at or near a bottom dead center position in the cylinder 12. When the piston 14 is driven downward as a result of combustion occurring in the chamber 16, the connecting rod 20 drives the crankshaft 36 about the rotation axis A-A via the crank arms 32a, 32b in the direction of the arrow in FIG. 6. At the same time, the gear rack 22 is driven linearly downward in the direction of the arrow in FIG. 6, with the teeth 46 of the gear rack 22 thereby driving the gear 48 in a counterclockwise direction as indicated by the arrow in FIG. 6. The one-way drive mechanism 54 is set-up so that this counterclockwise rotation of the gear 48 also drives the crankshaft 36 about the rotation axis A-A. Therefore, as indicated by the arrows in FIG. 6, the gear 48 and the crankshaft 36 rotate in the same direction during the power stroke or downstroke of the piston 14.

Driving of the gear 48 in the counterclockwise direction by the gear rack 22 occurs as long as the piston 14 continues its downward stroke. Referring to FIG. 7, once the piston 14 reaches bottom dead center and starts its return upward stroke, the connecting rod 20 continues to drive the crankshaft 36 about the rotation axis A-A in the direction of the arrow in FIG. 7. At the same time, the gear rack 22 is driven linearly upward in the direction of the arrow in FIG. 7, with the teeth 46 of the gear rack 22 thereby driving the gear 48 in a clockwise direction as indicated by the arrow in FIG. 7. The one-way drive mechanism 54 is set-up so that this clockwise rotation of the gear 48 occurs relative to the crankshaft 36 so that torque is not transmitted to the crankshaft 36 by the gear rack 22 as the gear rack 22 moves upward on the return stroke of the piston 14. Therefore, as indicated by the arrows in FIG. 7, the gear 48 rotates in a clockwise direction while the crankshaft 36 rotates in the counterclockwise direction during an upstroke of the piston 14 and the gear rack 22.

Figure 8:
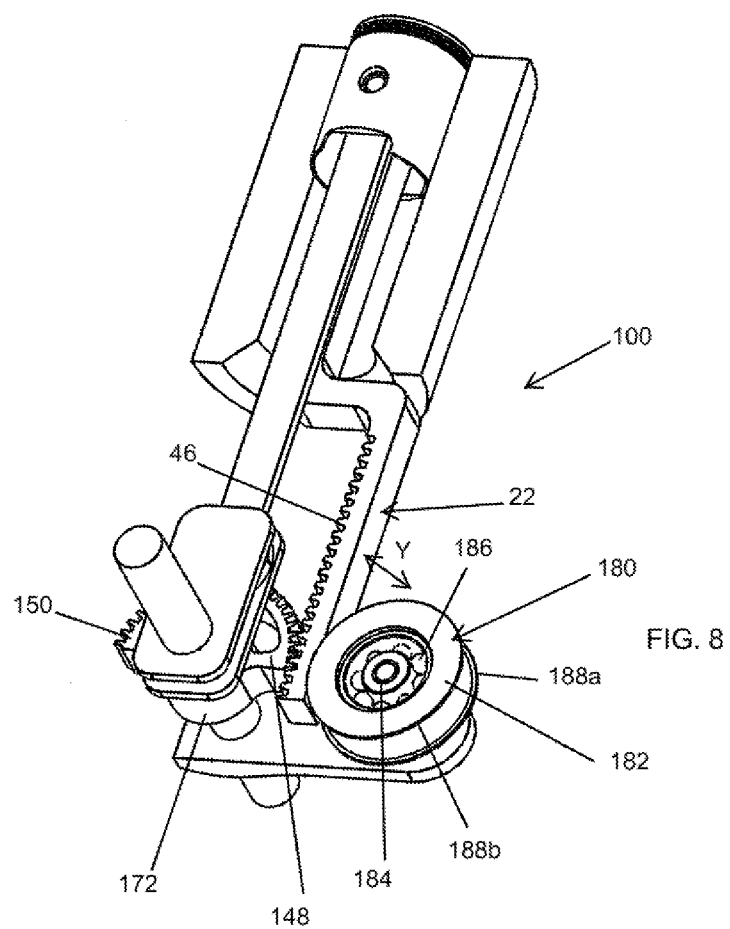
FIG. 8 is a perspective view of another embodiment of an internal combustion engine described herein with half of the cylinder removed and the piston at or near a top dead center position.
Figure 9:
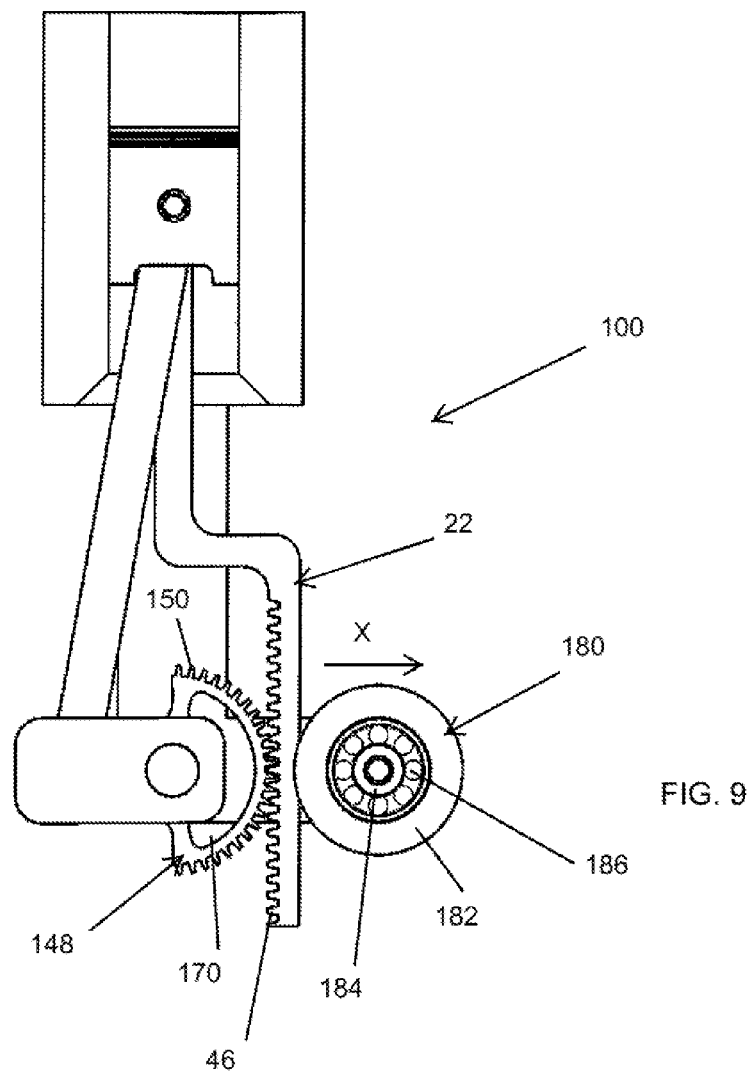
FIG. 9 is a side view of the internal combustion engine of FIG. 8 with the piston at an intermediate position on a down stroke.
Figure 10:
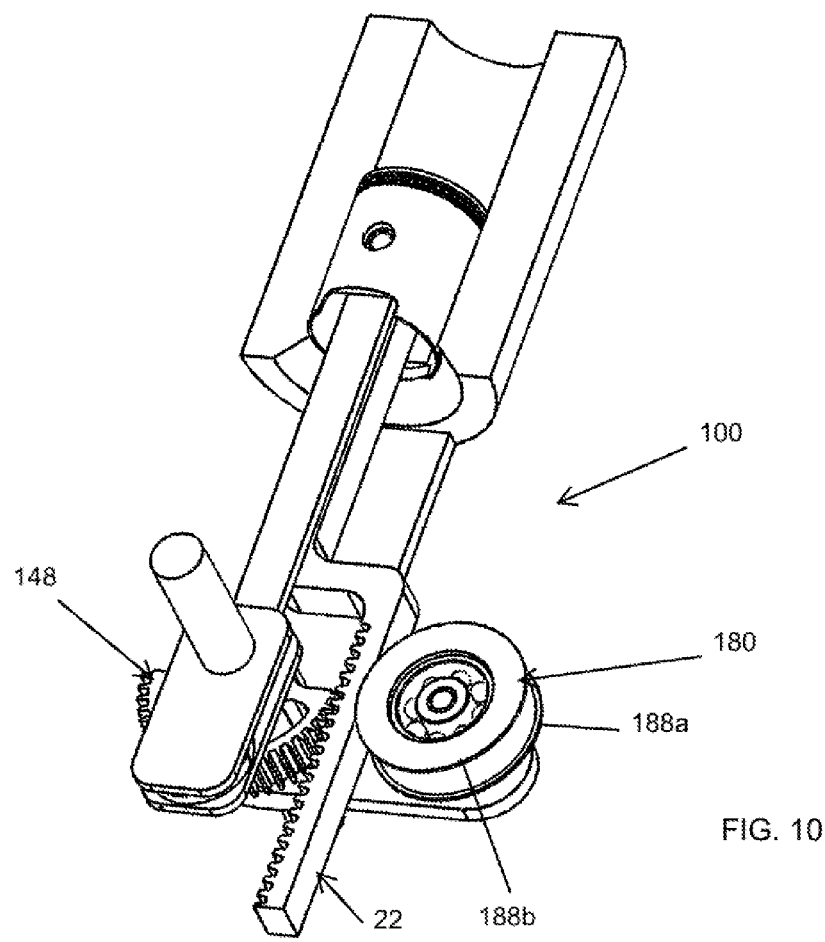
FIG. 10 is a perspective view of the internal combustion engine of FIG. 8 with the piston at or near the bottom dead center position.

With reference to FIGS. 8-10, another embodiment of an internal combustion engine 100 is illustrated. The engine 100 is similar to the engine 10 with like elements referenced using identical reference numbers. Unless otherwise noted herein, the construction and operation of the engine 100 and its elements is identical to the construction and operation of the engine 10.

The engine 100 differs from the engine in that the engine uses a partial gear 148 instead of the full circular gear 48 in FIGS. 1-7. The gear 148 would include the one-way drive mechanism 54 described in the engine 10 of FIGS. 1-7. The gear 148 has less mass than the gear 48, thereby reducing its inertia. In the illustrated example, the gear 148 is a half-gear with gear teeth 150 that extend over about 180 degrees and that are engaged with the teeth 46 of the gear rack 22. The gear 148 is also illustrated as including a cut-out section 170 where the material forming the gear between a hub 172 of the gear 148 and the gear teeth 150 is removed to further help reduce the mass of the gear 148. The partial gear 148 can also be used with the engine 10 in FIGS. 1-7.

FIGS. 8-10 also illustrate the engine 100 as including a hold down mechanism 180. The hold down mechanism 180 is configured to prevent lateral shifting of the gear rack 22 in the direction X (shown in FIG. 9) and to prevent side-to-side shifting of the gear rack 22 in the direction Y perpendicular to the direction X (shown in FIG. 8) in order to keep the gear rack 22 properly engaged with the gear 148. A similar hold down mechanism 180 can be used with the gear rack 22 in the engine 10 in FIGS. 1-7.

The hold down mechanism 180 can have any construction suitable for achieving the functions of the hold down mechanism 180. In the embodiment illustrated in FIGS. 8-10, the hold down mechanism 180 includes a wheel 182 that is rotatably mounted on a shaft 184 by bearings 186. As best seen in FIGS. 8 and 10, the wheel 182 can include flanges or rims 188a, 188b that define a channel therebetween which receives the gear rack 22. The flanges 188a, 188b prevent side-to-side shifting of the gear rack 22 in the direction Y. The wheel 182 may also be adjustably mounted to permit adjustment of the position of the wheel 182 in the direction X to properly position the wheel 182 relative to the gear rack 22 to prevent lateral shifting of the gear rack 22 in the direction X and to provide proper force on the gear rack 22. The hold down mechanism 180 can have constructions other than the wheel 182 described herein. For example, the hold down mechanism 180 can be configured as a slide mechanism that slides up and down with the gear rack 22 while maintaining the gear rack 22 engaged with the gear 148.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. An internal combustion engine, comprising:
 a cylinder with a piston slidably disposed in the cylinder and that reciprocates relative to the cylinder, the cylinder has a centerline and defines a combustion chamber;
 a connecting rod having a first end and a second end, the first end is connected to the piston so that the connecting rod reciprocates with the piston;
 a first crank arm connected to and rotatably driven by the second end of the connecting rod by a pin;
 a crankshaft connected to and rotatably driven by the crank arm;
 a gear rack having an end that is connected to the piston so that the gear rack reciprocates with the piston, the gear rack is formed with teeth;
 a gear that is mounted on the crankshaft, the gear having teeth that are engaged with the teeth on the gear rack, and the gear is rotatable in forward and reverse directions by the gear rack;
 a one-way drive mechanism between the gear and the crankshaft, the one-way drive mechanism causing the crankshaft to rotate when the gear is rotated in the forward direction by the gear rack and allowing the gear to rotate relative to the crankshaft when the gear is rotated in the reverse direction;
 wherein the gear rack, the gear and the one-way drive mechanism provide square torque transmission from the piston to the crankshaft.

2. The internal combustion engine of claim 1, wherein the gear includes a center, and the centerline extends through the center of the gear.

3. The internal combustion engine of claim 1, wherein the crankshaft includes a first crankshaft portion and a second crankshaft portion; the first crank arm is connected to the first crankshaft portion, the gear is mounted on the second crankshaft portion; and the first crankshaft portion has a rotation axis that is colinear with a rotation axis of the second crankshaft portion.

4. The internal combustion engine of claim 3, further comprising a second crank arm connected to and driven by the second end of the connecting rod, and the second crank arm is connected to and drives the second crankshaft portion.

5. The internal combustion engine of claim 1, wherein the gear has a diameter and the first crank arm has a length, and the diameter of the gear is equal to two times the length of the first crank arm which in turn is equal to a stroke of the piston.

6. The internal combustion engine of claim 1, wherein the gear rack includes a first portion that is parallel to and disposed on the centerline, and the gear rack includes a second portion that is parallel to and laterally spaced from the first portion and from the centerline.

7. The internal combustion engine of claim 1, wherein the gear is a half-gear with the teeth thereof extending over about 180 degrees.

8. The internal combustion engine of claim 7, wherein the half-gear includes a cut-out section.

9. The internal combustion engine of claim 1, further comprising a hold down mechanism engaged with the gear rack that keeps the gear rack engaged with the gear.

10. The internal combustion engine of claim 9, wherein the hold down mechanism is configured to prevent lateral and side-to-side shifting of the gear rack.

11. An internal combustion engine, comprising:
- a cylinder with a piston slidably disposed in the cylinder and that reciprocates relative to the cylinder, the cylinder has a centerline and defines a combustion chamber;
- a connecting rod that is connected to the piston so that the connecting rod reciprocates with the piston;
- a rotatable crank mechanism connected to the connecting rod that converts reciprocating motion of the piston into rotary motion of a crankshaft about a rotation axis;
- a gear rack with teeth that is connected to the piston so that the gear rack reciprocates with the piston;
- a gear in driving engagement with the teeth of the gear rack, the gear having a center and a rotation axis, and the centerline extends through the center of the gear; and
- the rotation axis of the crankshaft is colinear with the rotation axis of the gear.

12. The internal combustion engine of claim 11, wherein the crankshaft includes a first crankshaft portion and a second crankshaft portion; a first crank arm is connected between the connecting rod and the first crankshaft portion, the gear is mounted on the second crankshaft portion.

13. The internal combustion engine of claim 12, further comprising a second crank arm connected to and driven by the connecting rod, and the second crank arm is connected to and drives the second crankshaft portion.

14. The internal combustion engine of claim 12, wherein the gear has a diameter and the first crank arm has a length, and the diameter of the gear is equal to two times the length of the first crank arm which in turn is equal to a stroke of the piston.

15. The internal combustion engine of claim 11, wherein the gear rack includes a first portion that is parallel to and disposed on the centerline, and the gear rack includes a second portion that is parallel to and laterally spaced from the first portion and from the centerline.

16. The internal combustion engine of claim 11, wherein the gear is a half-gear with teeth thereof extending over about 180 degrees.

17. The internal combustion engine of claim 16, wherein the half-gear includes a cut-out section.

18. The internal combustion engine of claim 11, further comprising a hold down mechanism engaged with the gear rack that keeps the gear rack engaged with the gear.

19. The internal combustion engine of claim 18, wherein the hold down mechanism is configured to prevent lateral and side-to-side shifting of the gear rack.

* * * * *